United States Patent [19]

Iio et al.

[11] 4,153,832

[45] May 8, 1979

[54] OVERHEAD SUBMERGED ARC WELDING PROCESS

[75] Inventors: Katsuro Iio; Naoki Takenouchi; Kimio Yamada, all of Fujisawa, Japan

[73] Assignee: Kobe Steel, Ltd., Kobe, Japan

[21] Appl. No.: 723,046

[22] Filed: Sep. 13, 1976

[30] Foreign Application Priority Data

| Sep. 11, 1975 | [JP] | Japan | 50-109499 |
| Nov. 19, 1975 | [JP] | Japan | 50-138208 |
| Nov. 19, 1975 | [JP] | Japan | 50-139536 |
| Mar. 11, 1976 | [JP] | Japan | 51-25605 |
| May 7, 1976 | [JP] | Japan | 51-52502 |

[51] Int. Cl.² .................................... B23K 9/18
[52] U.S. Cl. ...................... 219/124.34; 219/73.1; 219/73.2; 219/137 R; 219/160
[58] Field of Search .......... 219/73 A, 73 R, 60 R, 219/60 A, 136, 137 R, 73.1, 73.2, 124.34, 160; 228/33, 41, 44

[56] References Cited

U.S. PATENT DOCUMENTS

| 2,294,439 | 9/1942 | Bagley | 219/73 R |
| 3,227,349 | 1/1966 | Frederick | 228/41 |
| 3,351,734 | 11/1967 | Arikawa | 219/160 X |
| 3,643,853 | 2/1972 | Hiller | 228/41 |
| 3,745,294 | 7/1973 | Arikawa et al. | 219/73 R |

FOREIGN PATENT DOCUMENTS

| 42-16541 | 9/1967 | Japan | 228/33 |
| 469554 | 7/1975 | U.S.S.R. | 219/73 R |
| 479584 | 11/1975 | U.S.S.R. | 219/73 R |

OTHER PUBLICATIONS

Automatic Welding with Flux of Tubes in Upward Position, Russian Publication #11 (1958), pp. 19-23.

*Primary Examiner*—E. A. Goldberg
*Attorney, Agent, or Firm*—Oblon, Fisher, Spivak, McClelland & Maier

[57] ABSTRACT

The present disclosure relates to an overhead submerged arc welding process wherein a flux for the submerged arc welding is supplied from the underside of the welding line while at the same time a consumable electrode is supplied from the underside of the welding line, the process being characterized by maintaining the interrelationship between a flux supply cylinder and the plates to be welded such that the length from the under surfaces of the plates to be welded to the upper end of the open flux supply cylinder and the diameter D of the opening at the end of the flux supply cylinder is represented by the formula $2 \leq D/I \leq 15$.

19 Claims, 22 Drawing Figures

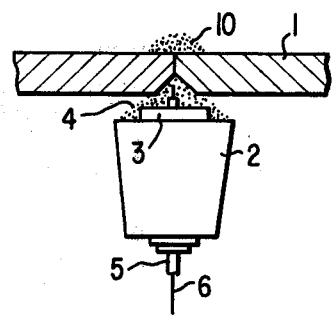
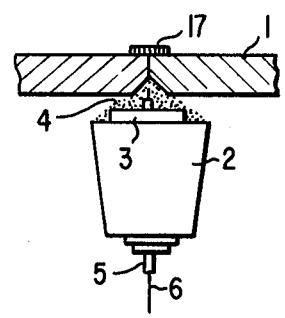
FIG.3  FIG.4
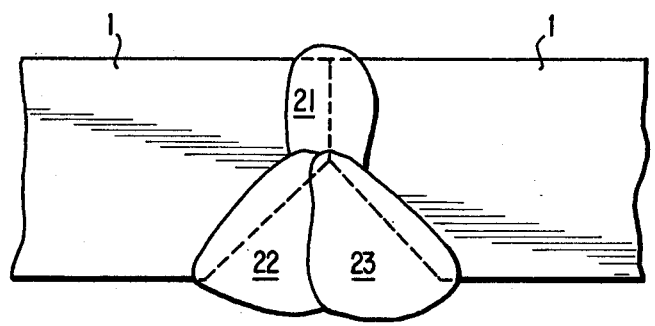
FIG.5
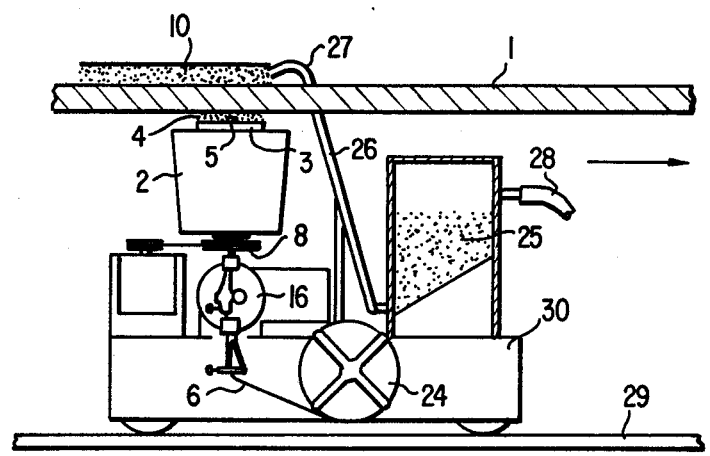
FIG.6

WELDING LINE

WELD ADVANCING DIRECTION

OVERHEAD SUBMERGED ARC WELDING PROCESS

BACKGROUND OF THE INVENTION

1. Field of the Invention

The present invention relates to an overhead submerged arc welding process wherein a flux for submerged arc welding is pressed onto the portion to be welded from the underside of the welding line of the plates to be welded and the welding is effected while feeding a consumable electrode from the underside of the plates to be welded.

2. Description of the Prior Art

Overhead welding has conventionally been accomplished by means of a hand welding process, a TIG welding process, a MIG welding process and a $CO_2$ gas shielded welding process. However, such conventionally known processes have disadvantages in that the amount of deposit along the path is small, that a number of steps is required, that soundness of the weld cannot be easily obtained, and that there are environmental problems for the operators. For this reason, overhead welding has been considered not to be suited for welding relatively thick plates such as welding of the bottom shell plates in the shipbuilding industry. It has, therefore been proposed to apply the submerged welding technique which provides a large amount of welded metal over such a path. For example, there has been disclosed in an article "Automatic Welding with Flux of Tubes in Upward Position" in Welding Process (Russion Publication), No. 11 (1958), pages 19 to 23, an overhead submerged welding process which is applied for welding a pipe. According to the above mentioned reference, there is disclosed a submerged welding process using a flux hopper which supplies a circulated flux for submerged welding to the welding line and in the vicinity thereof and a consumable electrode extending through the flux hopper for effecting submerged welding from the underside of the pipe without using a backing strip, wherein the inner surface of the welding joint pipe is welded at a first place and the pipe is then rotated by 180 degrees to be welded from the upperside thereof by means of flat welding, whereupon dropping of the molten metal is prevented by the welded metal formed by the overhead submerged arc welding process even when a backing strip is not used on the inner wall of the pipe. The quality of the welded portion formed by the overhead submerged arc welding process is determined by the composition and grain size of the used flux which is supplied from the underside of the welding line, and depends on the method of supplying the flux into the groove and in the vicinity thereof, as well. In order to suitably supply the flux into and in the vicinity of the groove from the underside portion thereof, it is necessary to press the flux into the vicinity of the welding arc at a suitable pressure and to supply flesh flux as the welding is advanced and to remove the consumed and slagged flux. Smooth cyclic operations for supplying and removing the flux shall be accomplished. The overhead submerged arc welding process has not yet been practically applied for effecting abutt welding of thick plates because of various problems as exemplified in the foregoing descriptions. Accordingly, there is a demand for the development of an overhead submerged arc welding process which may be easily practiced and which provides a sound welded portion.

SUMMARY OF THE INVENTION

The present invention provides a process which overcomes various problems as set forth above. It is, therefore, the primary object of the present invention to provide an overhead submerged arc welding process which is readily available for practical uses.

Another object of the present invention is to provide an overhead submerged arc welding process which is efficient and simple.

The first feature of the present invention for attaining the above and other objects of the invention is to provide an overhead submerged arc welding process wherein a flux for submerged arc welding is supplied from the underside of the welding line while at the same time a consumable electrode is fed from the underside of the welding line, the process being characterized by maintaining the interrelationship between a flux supply cylinder and the plates to be welded such that the the length from the under surfaces of the plates to be welded and the upper end of the open flux supply cylinder and the diameter D of the opening at the end of the flux supply cylinder is represented by the formula of $2 \leq D/1 \leq 15$.

The second feature of the present invention is that in the process as set forth in the first feature the flux for submerged arc welding is supplied from a flux supply apparatus which comprises a flux containing hopper, a screw provided with a plurality of helical vanes arranged in the flux containing hopper for supplying the flux contained in the flux containing hopper onto the under surface of the plates to be welded and for pressing the flux against the same, and a driving means for rotating the screw.

The third feature of the present invention is that in the process as set forth in the first feature the welding is effected while supplying and pressing the flux onto the under surface of the plates to be welded by means of gas pressure.

The fourth feature of the present invention is that in the process as set forth in the first feature a flux containing iron powders and/or iron alloy powders is used as the flux for overhead submerged arc welding.

The fifth feature of the present invention is that in the process as set forth in the first feature an overhead submerged arc welding is effected by supplying a pulverized flux for overhead submerged arc welding onto and into the vicinity of an overhead welding groove without a root gap from the underside of the plates to be welded and spreading a pulverized flux which can form an upper bead over the upper surface of the welding line and over the vicinity of the welding line.

The sixth feature of the present invention is that in the process set forth in the first feature an overhead submerged arc welding is effected by supplying a pulverized flux for overhead submerged arc welding onto and into the vicinity of an overhead welding groove and by overlaying a solid flux which can form an upper bead on and near the welding line.

The seventh feature of the present invention is that in the process as set forth in the first feature the uppermost portion of the welding groove is welded at the first place by means of an overhead submerged arc welding, and thereafter beads of welded metal are laminated on the surface of the bead formed by the overhead submerged arc welding step initially taking place by effecting at least one additional submerged arc welding step.

The eighth feature of the present invention is that in the process as set forth in the first feature which is applied for welding a joint having a root gap by means of an overhead one-side submerged arc welding process a flux containing iron powder and/or iron alloy powder is used as the flux for forming an upper bead thereby allowing the iron powders and/or iron alloy powders to bridge over the root gap along the line of magnetic force created by a welding current so as to support the flux for forming an upper bead and a flux for submerged arc welding is also supplied in the vicinity of the consumable electrode from the underside of the welding portion and is pressed thereto.

The ninth feature of the present invention is that in the process as set forth in the eighth feature the flux for forming the upper bead is supplied onto the upper surfaces of the plates to be welded and positioned forwardly relative to the direction of the overhead submerged arc welding operation.

The tenth feature of the present invention is that in the process as set forth in the ninth feature a backing strip is disposed over the welding line so as to be spaced from the plates to be welded by a predetermined gap and a flux for forming the upper bead is supplied into the gap positioned forwardly relative to the direction of the overhead submerged arc welding operation.

The eleventh feature of the present invention is that in the process as set forth in the first feature the overhead submerged arc welding is effected by preliminarily charging and/or delivering a filler wire (filler metal) into a groove having a root gap which is broader than the diameter of a consumable electrode, and by effecting straight manipulation of the consumable electrode.

The twelfth feature of the present invention is that in the process as set forth in the first feature which is applied for welding a groove having a broad root gap by means of a one-side overhead submerged arc welding process, a supporting member which is allowed to melt by the welding heat is disposed in the groove or over said the broad root gap and a flux for forming the upper bead is spread over the upper surface of the supporting member or into and in the vicinity of the root gap beyond the supporting member.

The thirteenth feature of the present invention is that in the process as set forth in the first feature which is applied for welding a groove provided with an abutting portion so as to form a side butt welded portion, a preceding welding is carried out by flat arc welding in such a manner that unmelted portions remain at the lower part of the groove and that unmelted portions are subsequently welded by means of an overhead submerged arc welding.

The fourteenth feature of the present invention is that in the process as set forth in the thirteenth feature the temperatures of the under surfaces of the plates to be welded due to the welding heat of the preceding flat welding operation are measured at two points on both sides of the welding line so as to be compared with each other for detecting the measured temperature difference following which the subsequent welding is effected by moving the consumable electrode for overhead submerged arc welding along the welding line.

The fifteenth feature of the present invention is that in the process as set forth in the thirteenth feature a welding torch is moved in a direction perpendicular to the welding line to be followed by disposing detectors which may be moved integrally with the welding torch, while maintaining a constant distance from the surfaces of the plates to be welded at positions opposed to one another on both sides of the welding line and positioned in the vicinity of the welding line, and by ejecting vortex flows of gas onto the upper surfaces and/or the under surfaces of the plates to be welded for detecting the pressures of the vortex flow generated by the detectors and comparing the pressures detected on both sides of the welding line by a comparator so as to obtain a compared signal, and by moving the welding torch in such a manner that the pressure difference as detected is maintained smaller than a predetermined value.

The sixteenth feature of the present invention is that in the process as set forth in the thirteenth feature of the running speeds of the overhead submerged arc welding, electrode members are controlled by detecting the temperature of at least one arbitrary position of the plates to be welded by a temperature detecting member disposed on at least one of the overhead submerged arc welding electrode members which shall run in synchronism with the flat welding electrode for flat welding running along the welding line at a predetermined speed, and by discriminating the positions of the overhead submerged arc welding electrode members relative to that of the welding electrode for flat welding with reference to the temperature as detected.

BRIEF DESCRIPTION OF THE DRAWINGS

Various other objects, features and attendant advantages of the present invention will be more fully appreciated as the same becomes better understood from the following detailed description when considered in connection with the accompanying drawings, in which:

FIG. 3 is a view schematically showing a pulverized flux embodiment of the process of the present invention.

FIG. 4 is a view schematically showing a solid flux embodiment of the process of the present invention.

FIG. 5 is a schematic view showing the macrostructure of a welded portion formed by one embodiment of the process of the present invention.

FIG. 6 is a schematic view diagrammatically showing apparatus for performing a further embodiment of the process according to the present invention.

DETAILED DESCRIPTION OF THE ILLUSTRATED EMBODIMENTS

The present invention will now be described in detail with reference to the appended drawings.

Figure 1:
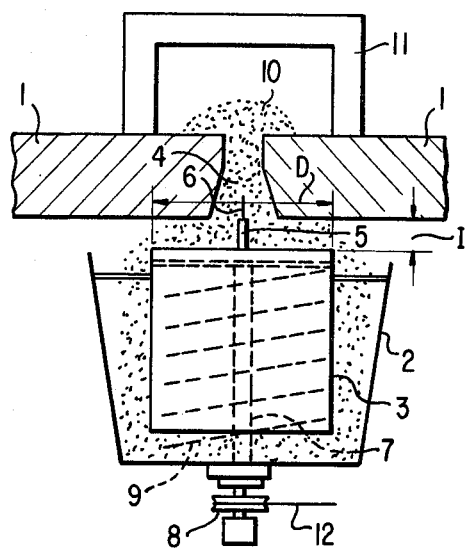
FIG. 1 is a schematic view showing the overhead submerged arc welding process of the present invention.

Referring now to FIG. 1 which shows a portion to be welded and the vicinity thereof and a screw feeder for supplying a flux for welding plates spaced from each other by a groove having a root gap, plates 1 and 1 to be welded are opposed to each other across a groove having a root gap and are temporarily secured by a restrainer 11. A cylinder 3 is disposed within an underlying flux supply hopper 2 into which a flux 4 is preliminarily charged. The upper end of the cylinder 3 having a diameter of D is spaced from the undersides of the plates 1 and 1 by a distance I. The cylinder 3 comprises a shaft 7 which is rotated by a belt 12 being stretched on a pulley 8, and a plurality of helical vanes 9 mounted on the shaft 7. An upper flux portion 10 is spread over the groove. A welding wire 6 is fed through the shaft 7 and passed into the groove via a welding torch 5. An overhead submerged arc welding operation is carried out while retaining the position of the screw feeder such that the interrelationship between the diameter D of the uppermost end of the cylinder 3 of the screw feeder and the distance I from the uppermost end of the cylinder 3 to the undersides of the plates to be welded is maintained to be $2 \leq D/I \leq 15$.

In accordance with the present invention, the interrelationship between the diameter D of the uppermost end of the cylinder of the screw feeder and the distance I from the uppermost end of the cylinder of said screw feeder to the undersides of the plates to be welded shall be maintained within the range of $2 \leq D/I \leq 15$, since the flux for overhead submerged arc welding (under flux) cannot be suitably supplied to and removed from the portion to be welded which results in the formation of an uneven bead or even a dropout of the molten metal if the interrelationship is without the aforenoted range. If $D/VI > 15$, the underside flux is not discharged appropriately from the cylinder of the screw feeder since the discharge thereof is obstructed by the undersides of the plates to be welded, so that it becomes impossible to feed or supply flesh flux to the welded portion. On the other hand, if $D/I < 2$, although circulation of the flux is improved the pressure of the underside flux is not maintained at a constant level and it become difficult to support the molten metal by the underside flux. For the above mentioned reasons, the value D/I shall be maintained within the range of $2 \leq D/I \leq 15$, the preferred range to obtain particularly good beads being $4 \leq D/I \leq 10$. For example, when the diameter of the upper end of the cylinder of the screw feeder is 140 mm, the distance I shall be maintained within the range of $14 \leq I \leq 35$ mm.

Figure 2:
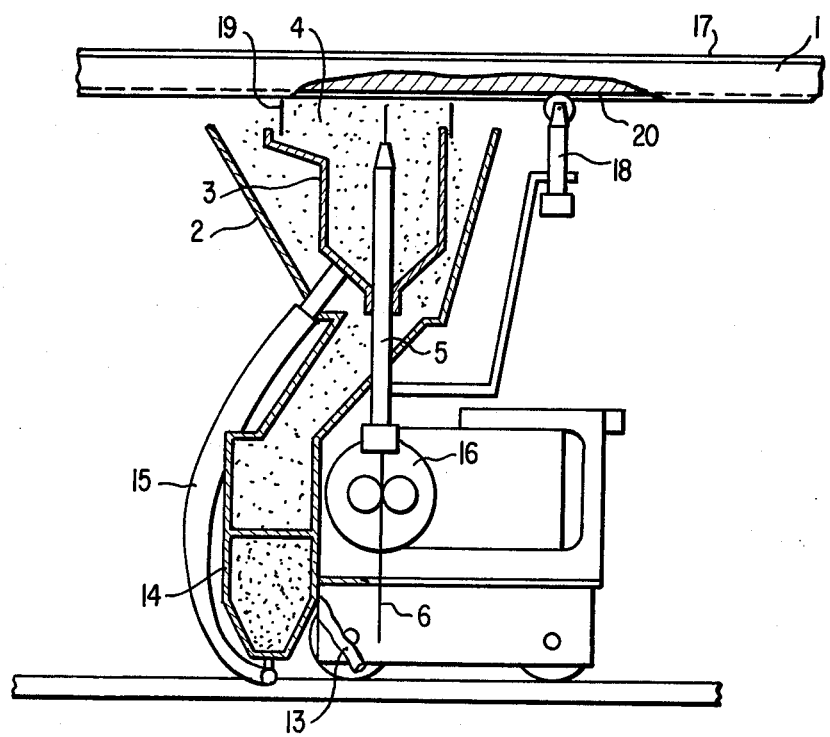
FIG. 2 is a schematic view showing a flux supply device of the overhead submerged arc welding process of the present invention.

FIG. 2 shows an example of a flux supply device used for practicing the process of the present invention. As shown, a supply hopper 2 is provided with a cylinder 3 disposed therein. A welding nozzle 5 is disposed within the cylinder 3. One end of a flux transport line 15 is connected to the lower portion of the cylinder 3 for feeding a mixed flow of a flux for submerged arc welding with a gas for transporting the flux by pressure, while the other end thereof is connected to a flux storage tank 14 which is provided with a conduit 13 for feeding therethrough the gas for transporting the flux under pressure. A welding wire 6 is fed to the vicinity of the undersides of the plates 1 to be welded, that is to the portion to be welded, by a wire feeder 16 and through a welding nozzle 5. A backing strip 17 may be disposed over the reverse side or upper surfaces of the plates 1 in the vicinity of the welding line 20. A welding line follower 18 is disposed for allowing the welding wire 6 to follow the welding line 20. A gas vent partition 19 which surrounds the upper end of the cylinder 3 may be provided for preventing the flux 4, which is pressed up to the portion to be welded, from being scattered.

FIG. 3 shows a process wherein a pulverized upper flux portion 10 which is capable of forming upper bead is used, whereas FIG. 4 shows a process wherein a solid flux (which acts as a backing strip) which is also capable of forming an upper bead is used. In FIGS. 3 and 4, a hopper 2 contains a cylinder 3 and a lower flux portion 4 of powder form, which flux 4 is pushed up onto the plates to be welded on the welding line and in the vicinity thereof. A welding wire 6 is fed through a welding nozzle 5 supported at the center of the cylinder 3 to establish an arc between the plates 1 and the wire 6 for effecting overhead submerged arc welding, thereby forming a reverse side bead on the upper surfaces of the plates 1.

FIG. 5 shows the section of a welded portion which is obtained by welding the plates in accordance with one embodiment of the present invention. An upper bead 21 is formed by welding the uppermost portion of the groove, having the shape of an inverted letter Y, by means of an overhead submerged arc welding step. Subsequently, beads 22 and 23 are laminated underneath the bead 21 by means of further overhead submerged arc welding steps so as to complete the weld process and to obtain a three-layer welding.

Figure 7:
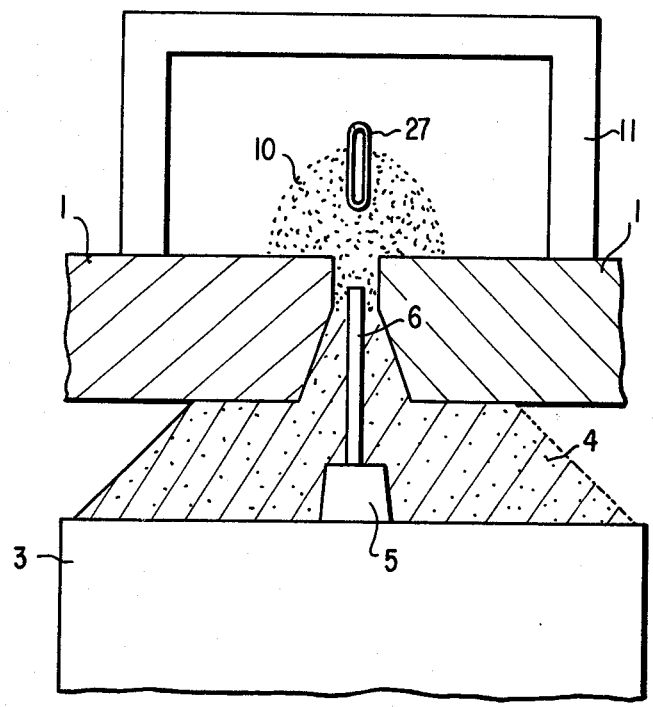
FIG. 7 is an enlarged view showing the embodiment shown in FIG. 6.

FIG. 6 shows a modified example of an overhead submerged arc welding device for use in the process of the present invention and having an upper flux feeder. FIG. 7 is an enlarged view showing the shape of the groove and an upper flux supply nozzle. Referring now to FIGS. 6 and 7, plates 1 and 1 to be welded have root surfaces separated by a root gap and are temporarily fixed by a restrainer 11. Rails 29 are laid beneath the plates 1 parallel to the groove, and a welding truck 30 runs on the rails 29. Mounted on the truck 30 are a wire feeder 16 for feeding a wire 6 from a wire reel 24 via a wire feeding nozzle 5 to the welded portion, a flux supply cylinder 3 surrounding the wire feeding nozzle 5, a hopper 2 surrounding the cylinder 3, and further an upper flux spreader 27 for spreading an upper flux portion 10 over the upper surfaces of the plates to be welded. The upper flux spreader 27 serves to mix a gas fed through a gas feeding conduit 28 with an upper flux portion in an upper flux feeding tank 25 and to pass the mixed flow of the gas and the upper flux through a mixed flow transport conduit 26 to the upper flow spreading nozzle for allowing the flux to be spread over the upper surface of the welding line. The process of the present invention using the above mentioned device will now be described. After confirming that a sufficient amount of the lower flux 4 which has been pushed up by the lower flux supply device is supplied to the groove and the vicinity thereof, the upper flux supply is commenced. Then, an arc is established between the wire 6 and the plates 1 to be welded. Since the upper flux 10 contains iron powder or iron alloy powder, the flux 10 in the vicinity of the arc is retained without falling down through the gap of the groove by the action of a magnetic field created by the welding current. As a result, constant spreading of the upper flux is ensured so as to result in the formation of a good upper bead on the upper surfaces of the plates 1 to be welded. The height and width of the spread upper flux may be readily changed by adjusting the distance of the upper flux supply nozzle 27 from the plates 1 to be welded. When the nozzle is positioned at a suitable level, the upper flux 10 may be used by and there is no need for recovering the upper flux after the completion of the welding operation. It has been confirmed that stable spreading of the upper flux may be effected if the width of the opening of the upper flux supply nozzle 27 is larger than 2 mm. Sufficient root gap of the groove is 4 mm or more in consideration of the thickness of the plate and clearance. The same flux may be used both as the upper and lower fluxes, and an eccentric roller may be mounted on the upper flux supply nozzle 27 within the vicinity of its foremost end for moving the nozzle 27 in upward and downward directions.

Figure 8:
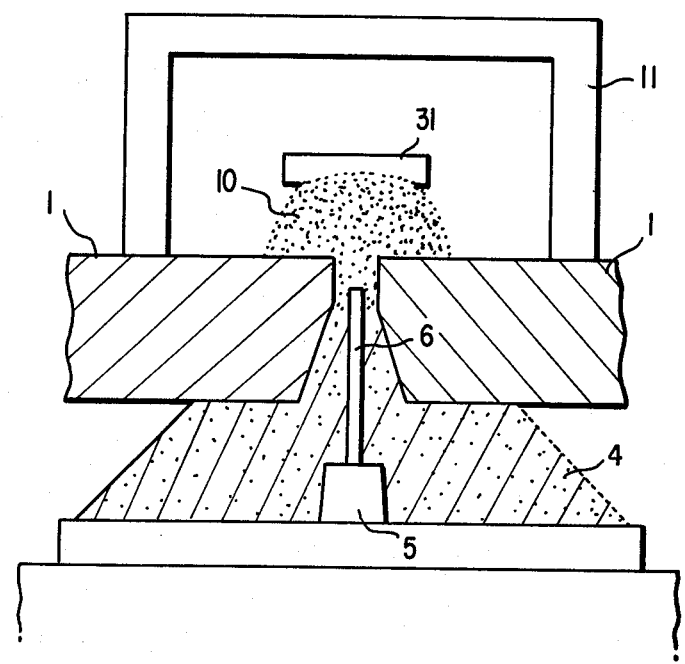
FIG. 8 is a schematic view showing a yet further embodiment of the process according to the present invention.
Figure 9:
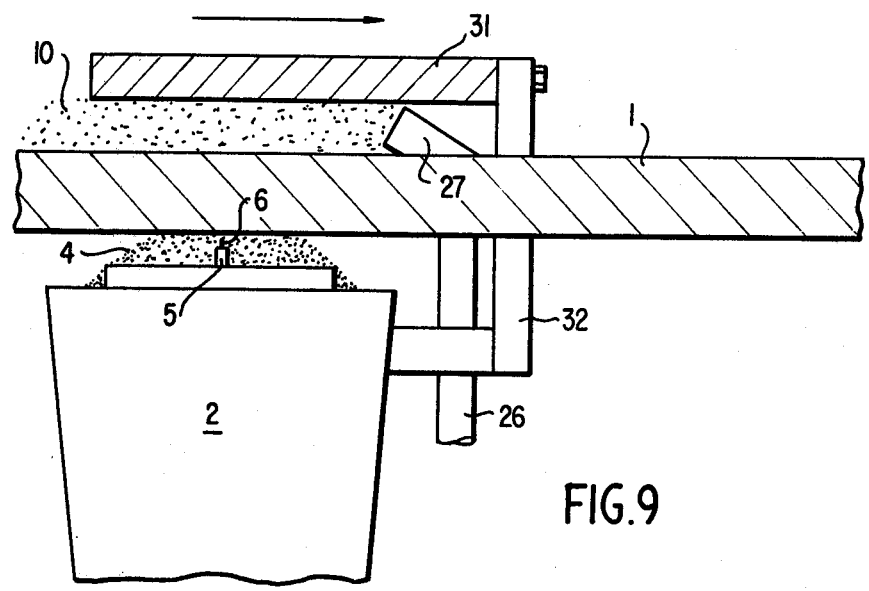
FIG. 9 is a schematic showing a yet further embodiment of the process according to the present invention.

FIGS. 8 and 9 show another modified example of the process of the present invention. FIG. 8 is a cross sectional view of the welded portion, while FIG. 9 is an elevational view thereof. Plates 1 to be welded are fixed by a restrainer 11 and the plates 1 are spaced by a distance defining a groove having a root gap. A lower flux 4 from the lower flux supply hopper 2 is pushed up into and in the vicinity of the groove so as to be charged into the gap, while the upper flux 10 is passed through an upper flux supply conduit 26 to the position over the welding line so as to be spread over the welding line and charged into the gap formed between the plates 1 to be welded and a slidable backing strip 31 supported by a support member 32. The upper flux supply conduit 26 and the support member 32 extend through the root gap of the groove. The upper flux is spread forwardly of the welding position which moves in the direction shown by the arrow in FIG. 9. If the upper flux 10 containing iron powder or iron alloy powder is used, the flux is prevented from falling down through the gap by the action of the magnetic force created between wire 6 fed through the welding nozzle 5 and the plates 1 to be welded.

Figure 10:
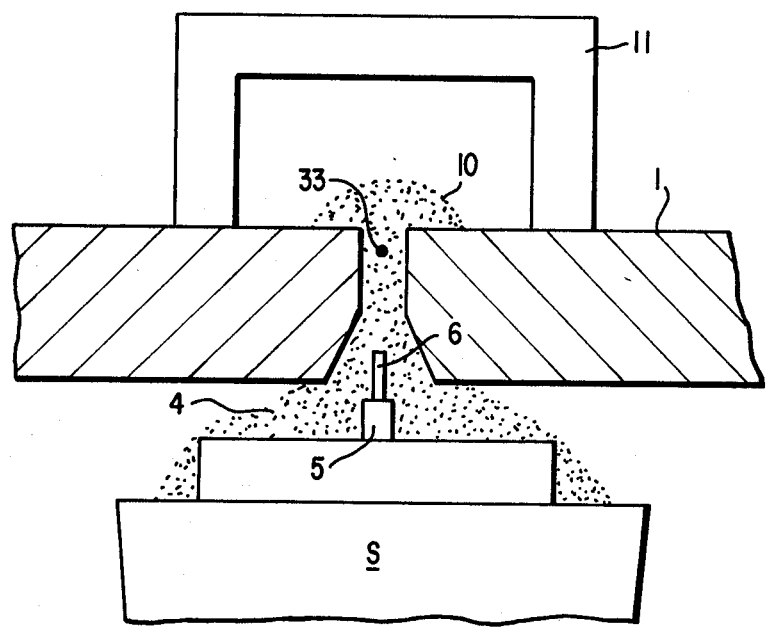
FIG. 10 is a schematic view showing a still further embodiment of the process according to the present invention.
Figure 11:
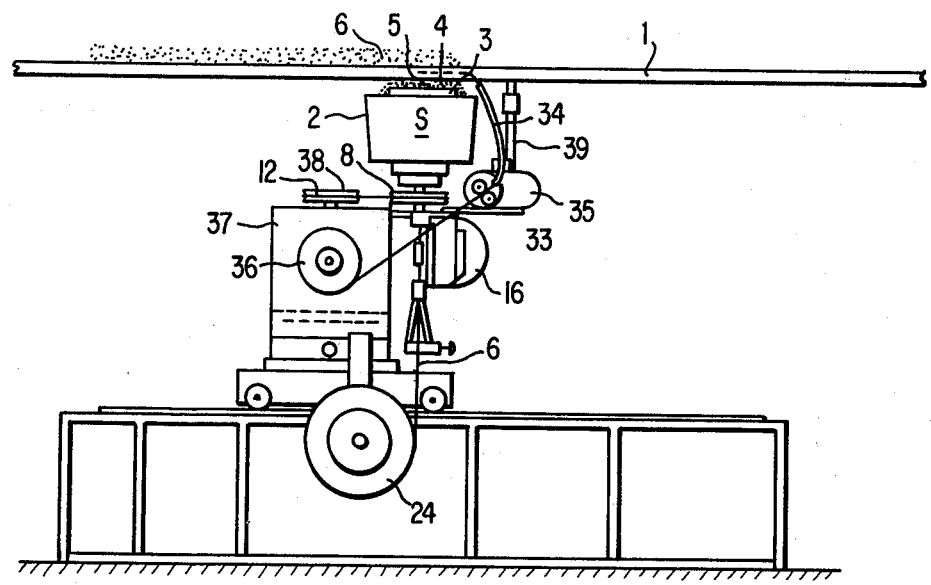
FIG. 11 is a schematic view showing apparatus for practicing a still further embodiment of the process according to the present invention.

FIGS. 10 and 11 show another modified example of the present invention. FIG. 10 is a sectional view of the plates to be welded which lie in the vicinity of the groove, while FIG. 11 is a side elevation of the apparatus used to practice the process of the invention. Plates 1 to be welded are temporarily fixed together by a restrainer 11. A lower flux 4 is pushed up into and in the vicinity of the groove by a screw feeder S. When the plates 1 to be welded are thick, an upper flux 10 is charged into the groove downwardly or laterally. The lower flux 4 circulates through a lower flux supply hopper 2 and a cylinder 3 provided with helical vanes. At the center of the cylinder 3 is disposed a welding nozzle 5 through which a welding wire 6 is fed. Forwardly of the direction along which the welding is advanced, there is disposed another nozzle 34 for feeding a filler wire 33 which is fed from a wire reel 36 through said nozzle 34 by a feeding motor 37. The welding wire 6 is fed from a wire reel 24 through the welding nozzle 5 by a feeding means 16. The helical vanes contained in the cylinder 3 of the screw feeder S for pushing up the lower flux 4 is rotated by motor 37 through a belt 12 which is stretched over a pulley 8 and another pulley 38 mounted to the output shaft of the motor 37. At the forward position of the filler wire feeding nozzle 34 is mounted a groove gap detecting mechanism 39 which also serves as a groove follower apparatus by which the width of the groove is sensed so as to be fed back to the filler wire feeding motor for adjusting the feeding speed of the filler wire thereby uniformalizing the formation of the upper bead and preventing through thrusting of the welding wire 6. Particularly, through thrusting of the welding wire 6 may be more easily prevented by using a flexible strip-shaped electrode which may be readily bent in the weld advancing direction, since such a flexible electrode is readily bent when it abuts against the filler wire 33.

Figure 12A:
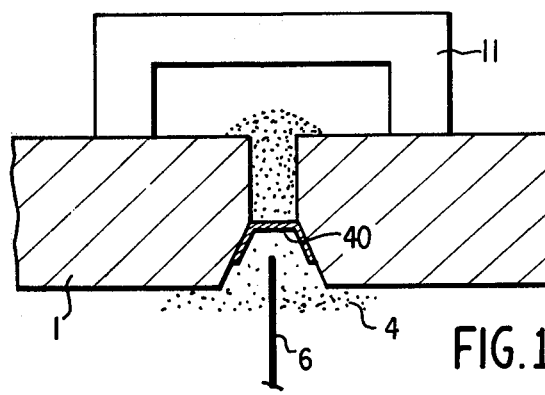
FIGS. 12(a) and 12(b) are schematic views illustrating one embodiment of an overhead one-side process according to the present invention.
Figure 12B:
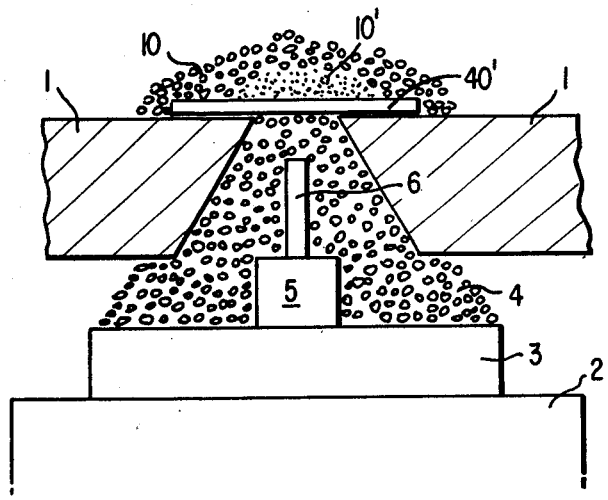

FIGS. 12(a) and 12(b) show an overhead one-side arc welding process according to the present invention wherein a support member is used. In the embodiment shown in FIG. 12(a) a glass tape 40 which may be melted by the arc is applied to the walls of the plates 1 defining the groove as a support member, whereas in the embodiment shown in FIG. 12(b) a thin steel plate 40' is used as a support member on which layers of iron powder 10' and flux powder 10 or a single layer of a flux 10 containing iron powders are preliminarily spread. When an overhead one-side arc welding operation is carried out with the constructions described above, the iron powder 10' or the thin steel plate 40' are subjected to the arc so as to be melted and through thrust of the electrode wire 6 may be advantageously prevented. When long plates are welded, the width of the groove gap is not constant but varied, so that if the welding is accomplished under constant conditions, the formed upper bead is uneven. An evenly formed upper bead may be obtained by adjusting the amount of the iron powder spread over the groove. In detail, the amount of the iron powder is increased at the positions where the widths of groove gap are broad since at such the positions, the upper beads are readily formed, whereas the amounts of iron powder are decreased at the positions where the widths of the groove gaps are narrow since at the latter mentioned positions upper beads are hardly formed. By adjusting the amounts of the iron powder as mentioned above, uniform upper beads may be formed even when the width of the groove gap varies. The process of the present invention is particularly directed to an overhead submerged arc welding process wherein a lower flux is pushed up from the underside of the portion to be welded by the use of a lower flux supply hopper. However, it should be appreciated that the principle of the present invention may be applied not only to submerged arc welding processes but also to TIG welding processes, MIG welding processes and gas shielded welding processes.

Figure 13:
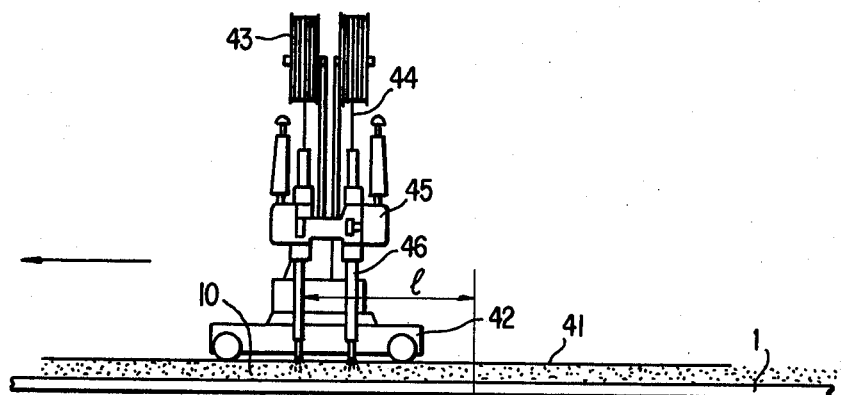
FIG. 13 is a schematic view showing apparatus for practicing a further embodiment of the process according to the present invention.
Figure 13:
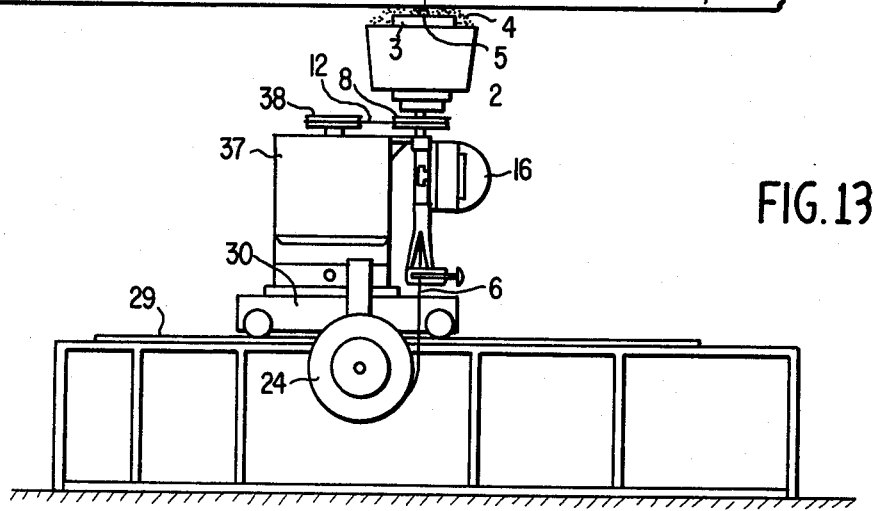

FIG. 13 shows a side elevation of an apparatus used for practicing a further embodiment of the process according to the present invention. As shown, a flat welding apparatus is disposed over the plates 1 to be welded and an overhead submerged arc welding apparatus is disposed under the plates 1. Firstly, the flat welding apparatus disposed over the plates 1 will be described. On the plates 1 are laid rails 41 on which a welding truck 42 is movably mounted. A wire 44 wound around a wire reel 43 is fed through a welding torch 46 by means of a wire feeding apparatus 45. An upper flux 10 has preliminarily been spread over the groove. The overhead submerged arc welding apparatus is basically the same as that shown in FIG. 11 except for the filler wire feeding means. In operation of the process of the instant embodiment of the present invention, flat arc welding is carried out at the first place in such a manner that an unmelted portion remains at the lower part of the groove between the plates 1, and then the unmelted portion is successively welded from the undersides of the plates 1 so long as the undersides of the plates are still hot by means of the overhead submerged arc welding. In accordance with the process set forth above, beads which are extremely intimately fitted with each other and which have good appearances may be formed, since the undersides of the plates to be welded are heated by the preceding flat welding operation and flux is continuously supplied in the vicinity of the electrode wire for facilitating formation of the beads. In the case where flat arc welding and overhead submerged arc welding are carried out in the direction of the arrow denoted in FIG. 13, the distance l between the welding electrode of the flat welding and the overhead submerged arc welding electrode is an important factor. The preferred distance is smaller than 500 mm. If the distance exceeds 500 mm, an increase in the welding speed cannot be expected since the preheating effect due to the preceding flat welding operation is insufficient, which results in a lack of penetration by the overhead submerged arc welding operation. On the other hand, if the overhead submerged arc welding is carried out prior to the flat welding, the welding speed should be decreased since the plates to be welded are not preheated, which also results in a decrease in of efficiency.

Figure 14A:
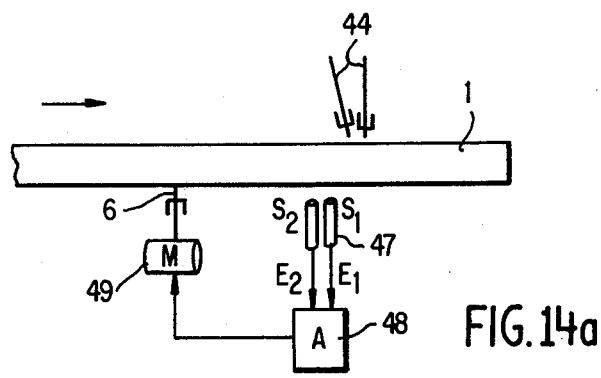
FIG. 14(a) is a schematic view illustrating a further embodiment of the process according to the present invention.
Figure 14B:
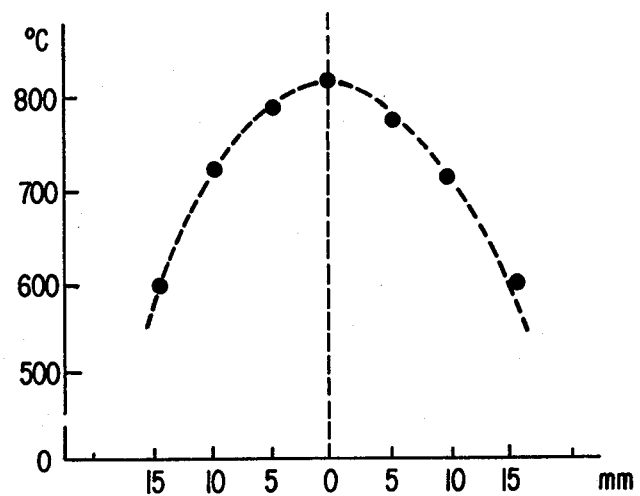
FIG. 14(b) is a graph showing the relationship between the temperature and distance from the welding line for the process of FIG. 14(a).
Figure 14C:
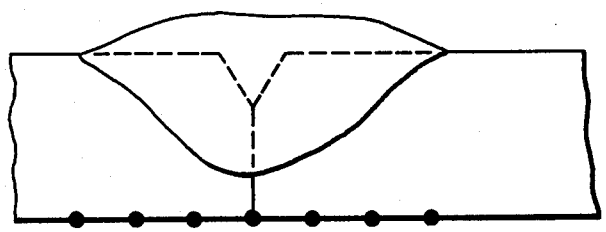
FIG. 14(c) is a schematic view showing the disposition of the temperature detectors.

Yet a further embodiment of the process of the present invention is shown diagrammatically in FIGS. 14(a) to 14(c). FIG. 14(a) is a diagrammatical view showing the principle of the process according to the present invention, in which reference numeral 1 designates one of the plates to be welded, numeral 44 designates a flat welding wire, numeral 6 designates a submerged welding wire, numeral 48 designates a converter and numeral 49 designates a driving motor for adjusting the position of the overhead submerged arc welding wire. Firstly, flat arc welding is carried out in such a manner that an unmelted portion is remains on the reverse sides, that is, the undersides, of the plates 1 to be welded while allowing the flat arc welding wire 44 to follow the groove by means of an appropriate measure. FIG. 14(b) shows the results of the measurements for detecting the temperature distribution in the direction perpendicular to the welding line positioned rearwardly of the point at which arcing takes place. In FIG. 14(b), the ordinate represents the temperature and the abscissa represents the distance from the welding line.

The temperature distribution is substantially symmetrical with respect to the welding line. Temperature detectors $S_1$ and $S_2$ which are combined with the succeeding overhead submerged arc welding wire are disposed at the positions respectively spaced perpendicularly from the welding line by appropriate distances, for example by the distances of 15 mm, as shown in FIG. 14(c), for detecting output signals $E_1$ and $E_2$ which are fed to the converter 48 shown in FIG. 14(a) to sense the difference $E_0 = E_1 - E_2$ between the signals $E_1$ and $E_2$. The position of the overhead submerged arc welding wire 6 along the direction perpendicular to the welding line may be adjusted by rotating the driving motor 49 in a positive or reverse direction depending upon whether the difference $E_0$ is positive or negative.

Figure 15A:
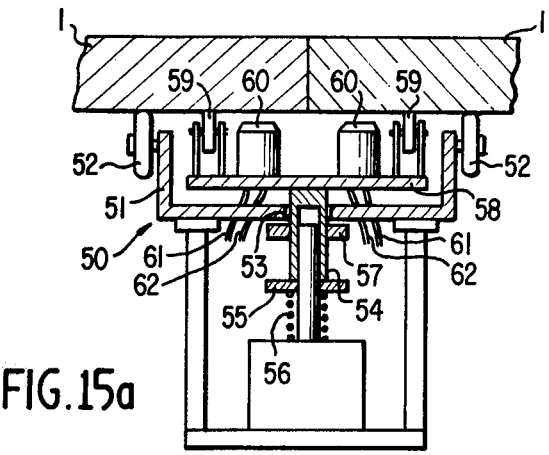
FIG. 15(a) is a schematic view showing an example of a follower mechanism used in the process of the present invention.
Figure 15B:
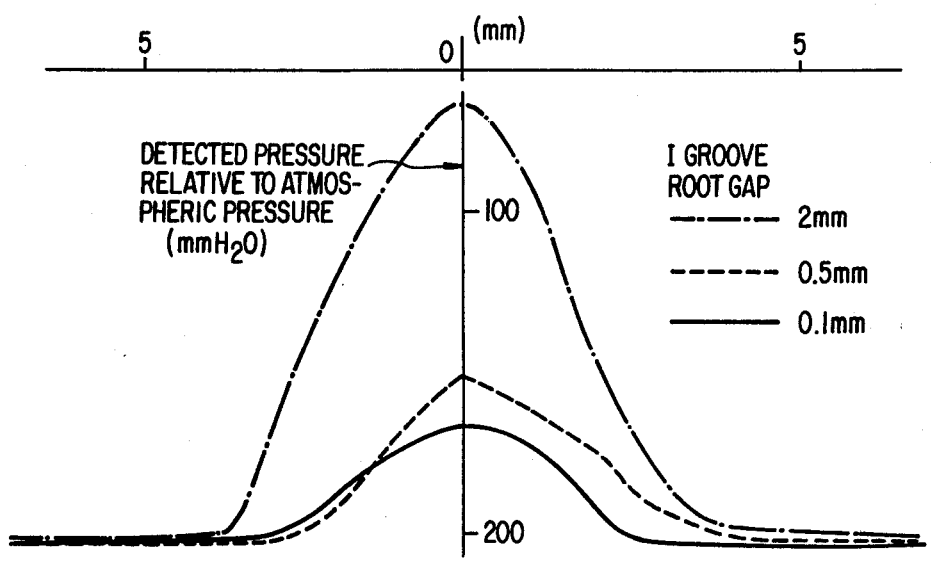
FIG. 15(b) is a graph showing the detected pressures as a function of the deviation from the welding line.
Figure 15C:
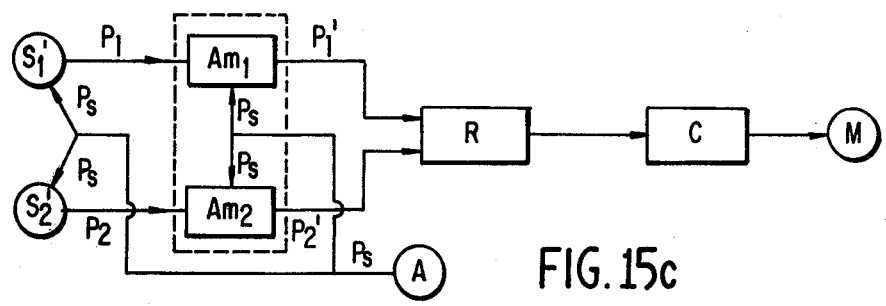
FIG. 15(c) is a schematic diagram of the electrical control circuitry for the apparatus of FIG. 15(a) and FIGS. 16(a) and 16(b) are views diagrammatically showing a speed control mechanism for a welding running member used in the process of the present invention.

FIGS. 15(a) to 15(c) are diagrammatical views showing yet another embodiment of the present invention. FIG. 15(a) shows a follower apparatus for tracing along the welding line. As shown in the Figure, plates 1 and 1 to be welded are intimately abutted with each other and a square groove having a substantially zero root gap is formed therebetween. However, a slight gap is inevitably formed at the welding line even in the above butt welding combination. There is disposed a welding truck 50 which extends laterally beyond the welding line on both sides thereof and which has a base 51 having rollers 52 at its sides and at its central portion a through hole 53 into which a sleeve 54 is loosely inserted. The sleeve 54 is provided with a flange 55 at its lower end and is continuously biased upwardly by means of a compression spring 56. A flange 57 mounted to the central portion of the sleeve 54 is engaged with and stopped by the base 51, so that the sleeve 54 is prevented from moving upwardly beyond such level. At the upper end of the sleeve is secured a support stand 58 on which a pair of rollers 59 and a pair of detectors 60 are mounted. The ends of the detectors 60 which are biased upwardly through support stand 58 are, therefore, spaced from the plates 1 by a constant gap by the action of the rollers 59. Each detector 60 is connected to a gas supply pipe 61 and a detected pressure transmitting pipe 62, and the supplied gas is ejected onto the surfaces of the plates 1 and 1 forming a vortex flow. The central portion of each vortex forms an eye similar to that of a typhoon and the pressure at the central portion is lower than atmospheric pressure. Since the pressure at the central portion of the vortex flow is varied depending upon the amount and the pressure of the ejected gas, and the distance from the ejection port to the surfaces of the plates to be welded, it is preferred to eject the gas under suitably selected optimum conditions. These detectors 60 and 60 are disposed at positions opposite each other with respect to the welding line, as shown in FIG. 15(a). However, the detectors shall be spaced from each other by a certain distance, because a considerable error is caused in the measurement of the pressures when these detectors are disposed so close to each other as to allow the right and left individual vortex flows influence each other. However, accuracy in the following movement decreases when the detectors are set at positions separated a considerable distance from the welding line. It is, therefore, desired to dispose these detectors in such a manner that they are deviated in the fore and aft directions so as to broaden the distance between these detectors while maintaining the same considerably close to the welding line so as to thereby render the mutual influence between the same as small as possible. Although, in the apparatus shown in FIG. 15(a), rollers 59 are used for separating the detectors 60 from the plates 1 and 1, the detectors 60 may be directly mounted on the base 51 and the distance between the detectors 60 and the plates 1 may be alternatively maintained by the rollers 51. Vortex flows are also formed on the surface of the plates to be welded by the action of the vortex flows ejected from the detectors. If the welding apparatus deviates from the welding line to such an extent that any one of the detectors 60 gradually approaches the welding line and finally comes to a position just below the welding line, the condition of the vortex flow ejected from the closer detector is disturbed by the influence of the atmospheric air or due to the the escapement of the vortex flow through the slight gap inevitably formed between the abutting surfaces although they appear to be intimately fitted with each other as shown in FIG. 15(a), and the pressure at the central portion of the vortex flow approaches atmospheric pressure. FIG. 15(b) is a graph showing the above mentioned phenomenon. In FIG. 15(b), there is shown variations of the differences from atmospheric pressure when one of the detectors 60 is moved from the left toward the right or from the right toward the left beyond the welding lines formed by a square or I-shaped groove having respectively root gaps of 0.1 mm, 0.5 mm and 2 mm. The line depending from the central point of the abscissa corresponds to the center of the welding line. As the points represented in the Figure deviate from the central line, the positions of the detector deviate from the welding line. As clearly understood from the graph, the detected pressure approaches atmospheric pressure when the detector is positioned just below the welding line, and the pressure is reduced as the detector is positioned farther from the welding line and becomes a stable condition when the detector is separated from the welding line by a distance of 4 to 5 mm. Further, it is appreciated that the pressure variation curves are symmetrical with respect to the center line. From the Figure, it has been found that satisfactory accuracy in following the movement of the welding apparatus cannot be obtained until the detectors are spaced from the welding line by the distance of more than about 3 mm, since the detected pressures fluctuate when the detectors come to the positions separated from the welding line by distances less than about 3 mm even for an I-shaped groove having apparently no root gap and the end surfaces of the plates to be welded are abutted with each other. Although the width of fluctuation of the detected pressure is broadened so as to occupy a remoter position from the welding line and at the same time the degree of pressure fluctuation becomes greater as the root gap becomes broader, a highly accurate following movement of the welding apparatus may be effected even when the root gap is broad so long as the detectors are separated from the welding line by the distance of 4 to 5 mm, since at such position the detected pressure is maintained at a stable condition, as clearly understood from the graph.

FIG. 15(c) is a block diagram of a system for treating the detected pressure wherein the detected pressure is converted into an electrical signal. Reference simbols $S_1'$ and $S_2'$ designate pressure detecting means in detectors 60 for detecting the pressures of the central portions of the vortex flow of a gas ejected upon both sides of the welding line. The pressure differences $P_1$ and $P_2$ obtained respectively by subtracting the detected pressures from atmospheric pressure are transmitted to pressure difference amplifiers $A_{m1}$ and $A_{m2}$, and the amplified pressure differences $P_1'$ and $P_2'$ are transmitted to a comparator R. If the result of comparison is found to be $P_1' = P_2'$ or the difference between them is smaller than a predetermined value, the detectors 60 and 60 are at positions spaced from the welding line by a substantially equal distance and precise welding is effected following the welding line. If $P_1' > P_2'$, then there is a pressure difference from atmospheric pressure at the $S_1'$ side and the detector 60 at the $S_2'$ side is closer to the welding line. The signal is then transmitted to an air pressure-electrical signal converter C so as to be converted into an electrical signal which causes the motor M to rotate in the direction for allowing the detector 60 at the $S_2'$ side to move away from the welding line. It should be noted that the positions of the welding torches may be simultaneously adjusted by adjusting the positions of the detectors 60, since the welding torches are combined with the detectors 60 for integrally moving therewith. The reference symbol A designates a gas supply source for supplying a gas to the detectors 60 and the pressure difference amplifiers at a supply pressure of $P_s$.

Figure 16A:
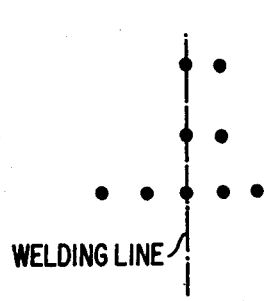
Figure 16B:
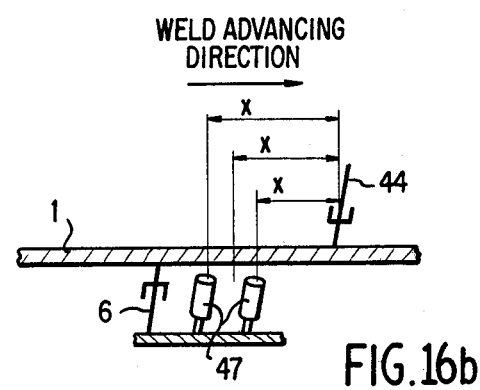

FIGS. 16(a) and 16(b) illustrate diagrammatically the welding speed control method which may be applied to the process of the present invention. FIG. 16(a) is a plan view showing the welding line and the temperature measuring points. The temperatures of the positions shown by black dots in the Figure are measured by applying thermoelectric couples on the reverse or underside surfaces of the plates to be welded for determining the temperature distribution within the plates to be welded. It has been found from the results of the temperature measurements that the temperatures of the plates become abruptly higher at a position spaced rearwardly from the arcing point by a certain distance so as to reach a maximum temperature and is then lowered as one moves rearwardly. According to one aspect of the present invention, the preceding and succeeding welding wires may be advanced in synchronism with each other by taking advantage of the characteristic temperature gradient on the welding line as mentioned above. Specifically, as shown in FIG. 16(b), two temperature detectors 47 are disposed between the preceding flat arc welding wire 44 and the succeeding overhead submerged arc welding wire 6 and within the range in which the temperature of the plates is abruptly raised. One of the temperature detectors is disposed at the position represented by $x<L$, wherein x is the distance between the arcing point of the preceding welding wire and the temperature detector and L is the distance between the arcing point of the preceding welding wire and the point at which the temperature of the underside of the plate to be welded reaches the highest temperature, whereas the other one of the temperature detectors is disposed at the position represented by $x>L$. By comparing the temperature difference between the values detected respectively by the two temperature detectors, the distance between the preceding and succeeding welding wires may be adjusted so as to be spaced by a substantially constant distance thereby utilizing the welding heat generated during the preceding welding operation for the succeeding welding operation so as to form a deeply penetrated weld. When each-side welding is effected while employing the above mentioned method, the welding heat generated during the preceding welding step may be utilized for controlling the advancing movements of both wires only by measuring the temperature distribution without the necessity of any particular signal generating source so as to allow them to move in synchronism with each other. As a result, the distance between the preceding welding electrode of flat welding and the succeeding overhead submerged arc welding electrode which follows in synchronism with the former electrode may be corrected even during the welding operation. Further, it is not essential to provide a gap, so that the sectional area of the groove may be reduced for improving the efficiency of the process.

As described in detail in the foregoing descriptions, the present invention provides a highly efficient and practically usable overhead submerged arc welding process.

Obviously, numerous modifications and variations of the present invention are possible in light of the above teachings. It is therefore to be understood that within the scope of the appended claims, the invention may be practiced otherwise than as specifically described herein.

What is claimed is:

1. An overhead submerged plate arc welding process wherein a flux for submerged arc welding is supplied from the underside of the welding line by a flux supply cylinder disposed within a flux supply hopper, the process comprising the steps of:
   securing a first and second plate in adjacent relationship
   mounting a shaft member, having a plurality of helical vanes mounted thereon, within said container;
   simultaneously feeding a consumable electrode from the underside of the welding line through said shaft and rotating said shaft member so as to rotate said plurality of helical vanes and supply said flux; and
   maintaining the interrelationship between said flux supply cylinder and the plates to be welded such that the length I from the under surfaces of said plates to be welded and the upper end of the open flux supply cylinder and the diameter D of the opening at the end of said flux supply cylinder is represented by the formula of $2 \leq D/I \leq 15$.

2. An overhead submerged arc welding process as claimed in claim 1, wherein a flux containing iron powders and/or iron alloy powders is used as the flux for said overhead submerged arc welding.

3. An overhead submerged arc welding process as claimed in claim 1, wherein:
   said overhead submerged arc welding is effected by supplying a pulverized flux for said overhead submerged arc welding onto and in the vicinity of a root-gapless overhead welding groove from the underside of the plates to be welded; and
   spreading said pulverized flux so as to form an upper bead over the upper surface of the welding line and over the vicinity of the welding line.

4. An overhead submerged arc welding process as claimed in claim 1, wherein said overhead submerged arc welding is effected by supplying a pulverized flux for said overhead submerged arc welding and overlaying a solid flux which can form an upper bead on and near the welding line.

5. An overhead submerged arc welding process as claimed in claim 1, wherein the uppermost portion of the welding line is first welded by means of an overhead submerged arc welding process, and thereafter beads of welded metal are laminated on the under surface of the bead formed by said overhead submerged arc welding step by effecting at least one additional overhead submerged arc welding step.

6. An overhead submerged arc welding process as claimed in claim 1, wherein the process is utilized for welding a joint having a root gap by means of an overhead one-side submerged arc welding process wherein a flux containing iron powder and/or iron alloy powder is used as the flux for forming an upper bead so as to thereby allow the iron powders and/or iron alloy powders to bridge over the root gap along the line of magnetic force created by a welding current so as to support the flux for forming an upper bead, and that said flux for said submerged arc welding is supplied in the vicinity of the consumable electrode from the underside of the welded portion and is pressed thereto.

7. An overhead submerged arc welding process as claimed in claim 6, wherein said flux for forming the upper bead is supplied onto the upper surfaces of the plates to be welded which are positioned forwardly along the direction of said overhead submerged arc welding operation.

8. An overhead submerged arc welding process as claimed in claim 7, wherein a backing strip is disposed over the welding line spaced from the plates to be welded by a predetermined gap and said flux for forming the upper bead is supplied into said gap positioned forwardly along to the direction of said overhead submerged arc welding operation.

9. An overhead submerged arc welding process as claimed in claim 1, wherein said overhead submerged arc welding is effected by preliminarily charging and/or delivering a filler wire or filler metal into a groove having a root gap which is broader than the diameter of said consumable electrode, and by effecting straight manipulation of said consumable electrode.

10. An overhead submerged arc welding process as claimed in claim 1, wherein the process is utilized for welding a groove having a broad root gap by means of a one-side overhead submerged arc welding process, wherein a supporting member which is allowed to melt by means of the welding heat is disposed in said groove and a flux for forming an upper bead is spread over the upper surface of said supporting member or into and in the vicinity of said root gap beyond said supporting member.

11. An overhead submerged arc welding process as claimed in claim 1, wherein the process is utilized for welding a groove having a broad root gap by means of a one-side overhead submerged arc welding process, wherein a supporting member which is allowed to melt by means of the welding heat is disposed over said broad root gap and a flux for forming an upper bead is spread over the upper surface of said supporting member or into and in the vicinity of said root gap beyond said supporting member.

12. An overhead submerged arc welding process as claimed in claim 1, wherein the process is utilized for welding a groove provided with an abutting portion so as to form a butt welded portion, wherein a first welding operation is carried out by a flat arc welding process in such a manner that unmelted portions remain at the lower part of said groove and said unmelted portions are subsequently welded by means of the overhead submerged arc welding process.

13. An overhead submerged arc welding process as claimed in claim 12, wherein:
   the temperatures of the under surfaces of the plates to be welded due to the welding heat of the first flat welding operation are measured at two points on both sides of the welding line so as to be compared with each other for detecting the measured temperature difference following which the subsequent-welding is effected by moving the consumable electrode for said overhead submerged arc welding along the welding line.

14. An overhead submerged arc welding process as claimed in claim 12, wherein:
a welding torch is moved in a direction perpendicular to the welding line to be followed along the same by disposing detectors which may be moved integrally with the welding torch while maintaining a constant distance from the surface of the plates to be welded at positions opposed to one another on both sides of the welding line and positioned in the vicinity of the welding line,
vortex gas flows are ejected onto the upper surfaces and/or the under surfaces of the plates to be welded for detecting the pressures of the vortex flow created by said detectors,
the pressures detected on both sides of the welding line are compared by a comparator so as to obtain a compared signal, and
the welding torch is moved in such a manner that the pressure difference as detected is maintained smaller than a predetermined value.

15. An overhead submerged arc welding process as claimed in claim 12, wherein the running speeds of said overhead submerged arc welding electrode members are controlled by detecting the temperature of at least one arbitrary position of the plates to be welded, by a temperature detecting member disposed on at least one of said overhead submerged arc welding electrode members which shall run in synchronism with the welding electrode for flat welding line at a predetermined speed, and by discriminating the positions of said overhead submerged arc welding electrode members relative to that of said welding electrode for flat welding with reference to the temperature as detected.

16. An overhead submerged arc welding process as claimed in claim 1, further comprising the step of circulating the flux supplied from the supply cylinder to the hopper so as to be reapplied to said plurality of vanes.

17. An overhead submerged arc welding process as claimed in claim 1, further comprising the step of securing said plates from overhead by a restrainer member.

18. An overhead submerged arc welding process as claimed in claim 1, further comprising the step of spreading an upper flux portion over a groove disposed between said plates.

19. An overhead submerged arc welding process as in claim 1 further comprising the steps of:
circulating the flux supplied from the supply cylinder to the hopper so as to be resupplied to said plurality of vanes;
securing said plates from overhead by a restraining member; and
spreading an upper flux portion over said groove disposed between said plates.

* * * * *